US009238286B2

(12) United States Patent
Lee et al.

(10) Patent No.: US 9,238,286 B2
(45) Date of Patent: Jan. 19, 2016

(54) METHOD OF CONTROLLING LASER BEAM PREHEATING TEMPERATURE OF SURFACE OF WORKPIECE

(71) Applicant: Changwon National University Industry Academy Cooperation Corps., Changwon-si, Gyeongsangnam-do (KR)

(72) Inventors: Choon-Man Lee, Changwon-si (KR); Dong-Hyeon Kim, Changwon-si (KR)

(73) Assignee: Changwon National University Industry Academy Cooperation Corps., Changwon-si, Gyeongsangnam-do (KR)

( * ) Notice: Subject to any disclaimer, the term of this patent is extended or adjusted under 35 U.S.C. 154(b) by 331 days.

(21) Appl. No.: 13/915,900

(22) Filed: Jun. 12, 2013

(65) Prior Publication Data

US 2014/0371900 A1    Dec. 18, 2014

(51) Int. Cl.
| | |
|---|---|
| B23C 1/00 | (2006.01) |
| B23K 26/08 | (2014.01) |
| B23P 25/00 | (2006.01) |
| G05B 19/416 | (2006.01) |
| B23K 26/30 | (2014.01) |

(52) U.S. Cl.
CPC ............ *B23P 25/006* (2013.01); *B23C 1/00* (2013.01); *B23K 26/08* (2013.01); *B23K 26/0807* (2013.01); *B23K 26/42* (2013.01); *G05B 19/416* (2013.01); *G05B 19/4163* (2013.01); *G05B 2219/49057* (2013.01); *G05B 2219/49061* (2013.01); *G05B 2219/49065* (2013.01)

(58) Field of Classification Search
CPC ...... B23C 1/00; B23K 26/08; B23K 26/0807; B23K 26/421; B23P 25/006; G05B 19/416; G05B 19/4163; G05B 2219/49057; G05B 2219/49061; G05B 2219/49065
USPC ................ 700/166, 173; 148/525; 219/121.6, 219/121.61, 121.64
See application file for complete search history.

(56) References Cited

U.S. PATENT DOCUMENTS

| | | | | | |
|---|---|---|---|---|---|
| 4,229,640 | A | * | 10/1980 | Castellani Longo ..... | 219/121.69 |
| 5,059,759 | A | * | 10/1991 | Kudo et al. ............. | 219/121.78 |
| 5,220,389 | A | * | 6/1993 | Kishimoto et al. ............. | 399/69 |
| 8,053,705 | B2 | * | 11/2011 | Shin ......................... | 219/121.76 |
| 8,847,114 | B1 | * | 9/2014 | Shin ......................... | 219/121.74 |
| 2004/0050905 | A1 | * | 3/2004 | Endo ..................... | B23K 1/005 228/101 |
| 2004/0104207 | A1 | * | 6/2004 | Wu et al. .................. | 219/121.73 |
| 2008/0087359 | A1 | * | 4/2008 | Zurecki et al. ............... | 148/511 |
| 2008/0210667 | A1 | * | 9/2008 | Yang ..................... | H01L 21/268 219/121.6 |
| 2009/0283501 | A1 | * | 11/2009 | Erikson et al. ............... | 219/76.1 |
| 2010/0065536 | A1 | * | 3/2010 | Patten ...................... | 219/121.66 |

FOREIGN PATENT DOCUMENTS

KR    10-1184311 B1    9/2012

* cited by examiner

*Primary Examiner* — Carlos Ortiz Rodriguez
*Assistant Examiner* — Jennifer L Norton
(74) *Attorney, Agent, or Firm* — Paratus Law Group, PLLC

(57) ABSTRACT

Disclosed is a method for, when a surface of a workpiece is preheated with a laser beam during milling, calculating an optimum preheating temperature according to a type of the workpiece and controlling a surface preheating temperature. The method includes: a processing condition inputting step; a matching step; a loading step; a preheating step; a measuring step; a comparing step; an ending step; a lower limit determining step; an output increasing step; and an output decreasing step.

2 Claims, 5 Drawing Sheets

FIG. 4

Table. Box-Behnken Design

| Exp. No. | S (rpm) | F (mm/min) | D (mm) |
|---|---|---|---|
| 1 | 0 | -1 | 1 |
| 2 | 0 | 1 | -1 |
| 3 | 0 | 1 | 1 |
| 4 | 0 | 0 | 0 |
| 5 | -1 | 1 | 0 |
| 6 | 0 | 0 | 0 |
| 7 | 0 | 0 | 0 |
| 8 | 0 | -1 | -1 |
| 9 | -1 | 0 | -1 |
| 10 | 1 | -1 | 0 |
| 11 | -1 | 0 | 1 |
| 12 | 1 | 0 | 1 |
| 13 | 1 | 0 | -1 |
| 14 | -1 | -1 | 0 |
| 15 | 1 | 1 | 0 |

FIG. 5

| Parameters | Levels | | |
|---|---|---|---|
| Coded level | Low (-1) | Middle(0) | High (+1) |
| Rotational speed [rpm] | 3,000 | 6,000 | 9,000 |
| Feed rate [mm/min] | 150 | 200 | 300 |
| Depth of cut [mm] | 0.4 | 0.6 | 0.8 |

FIG. 6

| Exp. No. | Rotational speed[rpm] | Feed rate [mm/min] | Depth of cut[mm] | Prediction Temperature $T_0$(℃) | Temperature $T_c$ (℃) | Error rate(%) |
|---|---|---|---|---|---|---|
| 1 | -1 | 1 | 0 | 852.5 | 855 | 0.29 |
| 2 | 1 | 0 | 1 | 800.62 | 800 | 0.08 |
| 3 | 0 | 0 | 0 | 861.67 | 860 | 0.19 |
| 4 | 0 | -1 | -1 | 981.88 | 980 | 0.19 |
| 5 | 1 | 0 | -1 | 958.12 | 960 | 0.20 |

METHOD OF CONTROLLING LASER BEAM PREHEATING TEMPERATURE OF SURFACE OF WORKPIECE

BACKGROUND OF THE INVENTION

1. Field of the Invention

The present invention relates to a method of controlling a laser beam preheating temperature of a surface of a workpiece, and more particularly, to a method of, when a surface of a workpiece is preheated with a laser beam during milling, calculates an optimum preheating temperature according to a type of the workpiece and controls a surface preheating temperature.

2. Description of the Prior Art

As generally known in the art, a polishing process is used to process a fragile material such as ceramic and cast iron. However, much time and energy is consumed in the polishing process as compared with a general processing process, when the material is processed into a complicated shape. If a heat source is irradiated to the material to soften and process the material, the highly fragile material even by a general processing process and a processing time and energy such as a cutting power consumed during the processing can be significantly reduced. Further, an amount of cutting oil required during the processing can be reduced and an amount of generated chips also can be reduced, thereby achieving an environmentally excellent effect.

Thus, a preheating turning and milling method has been suggested recently.

For example, Korean Patent No. 10-1184311 (entitled 'Milling Apparatus Employing Preheating Turning Process') discloses a preheating apparatus.

However, the related art discloses only a technology for an apparatus for preheating, so it is difficult to set an accurate preheating temperature in advance. Since a workpiece cannot be processed efficiently in the preheating turning and milling process if the workpiece is excessively or insufficiently preheated, it is important to select and control a preheating temperature.

SUMMARY OF THE INVENTION

Accordingly, the present invention has been made to solve the above-mentioned problems occurring in the prior art, and an object of the present invention is to provide a method of controlling a laser beam preheating temperature of a surface of a workpiece by which a preheating process is performed based on a preheating temperature which is calculated through a calculation equation in advance according to a type of the workpiece.

In order to accomplish this object, there is provided a method of controlling a laser beam preheating temperature of a surface of a workpiece, the method including: a processing condition inputting step of inputting a milling condition; a matching step of determining whether a surface preheating temperature matching with the processing condition input in the processing condition inputting step exists in a preset database; a loading step of, when it is determined in the matching step that the matching surface preheating temperature exists, loading the corresponding surface preheating temperature; a preheating step of preheating a portion to be processed, by using a laser beam according to the surface preheating temperature loaded in the loading step; a measuring step of measuring an actual temperature of the portion preheated in the preheating step with an infrared ray sensor; a comparing step of determining whether the actual temperature measured in the measuring step is similar to the preheating temperature loaded in the loading step; an ending step of, when it is determined in the comparing step that the actual temperature is similar to the preheating temperature, ending preheating; a lower limit determining step of, when it is determined in the comparing step that the actual temperature is not similar to the preheating temperature, determining whether the actual temperature is a lower limit value of the preheating temperature or lower; an output increasing step of, when it is determined in the lower limit determining step that the actual temperature is equal to or lower than the lower limit value of the preheating temperature, increasing an output of the laser beam; and an output decreasing step of, when it is determined in the lower limit determining step that the actual temperature is higher than the lower limit value of the preheating temperature, decreasing an output of the laser beam, wherein the measuring step is performed again after the output increasing step and the output decreasing step, wherein the surface preheating temperature is preset through a parameter inputting step of inputting a parameter value related to a processing condition, a calculating step of calculating a predicted surface temperature according to a parameter value input in the parameter inputting step, a test temperature measuring step of heating the workpiece with a laser beam and measuring a test temperature of the workpiece, a predicting/determining step of comparing the predicted surface temperature with the test temperature to determine whether the predicted surface temperature is similar to the test temperature, and a setting step of, if it is determined in the predicting/determining step that a difference between the predicted surface temperature and the test temperature is within an allowable value, setting the predicted surface temperature to the preheating temperature, and is stored in a database, wherein a changing step of, if it is determined in the predicting/determining step that a difference between the predicted surface temperature and the test temperature deviates from an allowable value, changing the parameter value is further performed, and wherein when the parameter value is changed in the changing step, a calculating step of calculating the predicted surface temperature again is performed.

In the calculating step, the predicted surface temperature is calculated through an experiment using a Box-Behnken method, and is determined by $T_o'=861.67-5.63S-15.63F-78.75D+1.04S^2+3.54F^2+22.29D^2+3.75S\times F$ when the workpiece is a steel.

The method of controlling a laser beam preheating temperature of a surface of a workpiece according to the present invention has the following effects.

A surface preheating process is performed by a laser beam according to a preset preheating temperature, and an intensity of a laser beam is adjusted by measuring a temperature of a preheated portion by using an infrared ray and comparing the measured temperature with a set preheating temperature. Thus, since the preheating process is automatically performed according to the most optimum preheating temperature, a milling process can be smoothly performed.

Further, since a surface preheating temperature which is most suitable for a workpiece is found out by using a Box-Behnken method, work efficiency can be improved and damage to a tool or the workpiece can be prevented.

BRIEF DESCRIPTION OF THE DRAWINGS

The above and other objects, features and advantages of the present invention will be more apparent from the following detailed description taken in conjunction with the accompanying drawings, in which:

FIG. 4 is an exemplary view of a Box-Behnken design used for calculation of a predicted temperature used in the embodiment of the present invention;

FIG. 5 is a table showing parameter values of a processing condition used in an experiment for verifying a preheating temperature used in the embodiment of the present invention; and FIG. 6 is a result table of an experiment for verifying a preheating temperature used in the embodiment of the present invention.

DETAILED DESCRIPTION OF THE PREFERRED EMBODIMENTS

Hereinafter, a method of controlling a laser beam preheating temperature of a surface of a workpiece according to an embodiment of the present invention will be described in detail with reference to the accompanying drawings.

Generally, there exists a proper temperature for processing of a material during a preheating process, and effective processing temperatures of materials will be described below. Since an annealing temperature of 'AISI 1045' is 550° C. or higher and an Al temperature (transformation temperature) thereof is about 726° C., the material can be softened and a residual stress can be removed from the material in a proper range of 550° C. to 726° C.

However, since heating by a laser beam heat source is very rapidly performed, the transformation temperature may be increased by the hysteresis phenomenon of the material. If a material is processed at an annealing temperature or lower, a cutting force is not reduced, which may offset the disadvantage of the laser beam preheating processing of the material, while the property of the material may be changed during the processing when the material is processed at a transformation temperature or higher, which deviates from the purpose of the processing.

Further, a melting temperature of 'Inconel 718' is about 1,260° C. to 1,336° C. A yield strength of 'Inconel 718' becomes lower at 650° C. to 950° C. Thus, an effective temperature of 'Inconel 718' for laser beam preheating processing is 650° C. to 950° C.

Further, in order to determine an effective temperature for laser beam preheating, a preheating temperature of a ceramic material does not exceed a glass transition temperature.

When a preheating temperature of a ceramic material exceeds a glass transition temperature, the material is changed into a liquid state so as not to be processed. Thus, the material is processed after being preheated shortly before the glass transition temperature.

Hereinafter, a steel, in particular, 'AISI 1045 steel' will be exemplified for convenience' sake.

Figure 1:
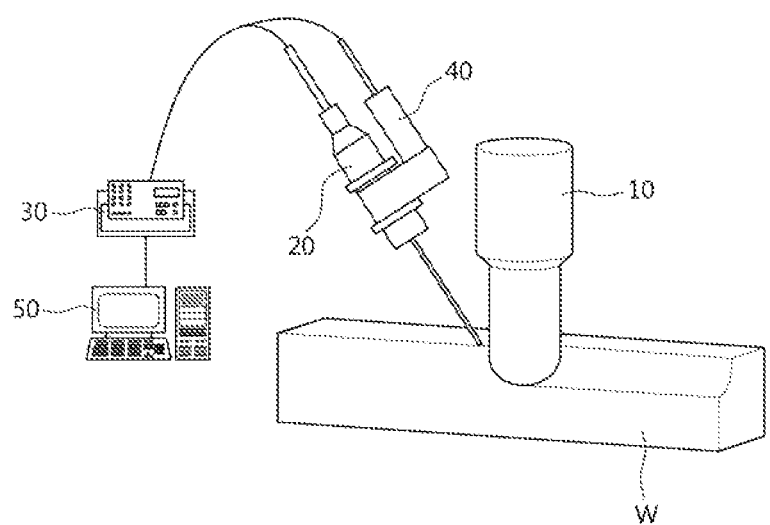
FIG. 1 is a diagram showing a milling system using a method of controlling a laser beam preheating temperature of a workpiece according to an embodiment of the present invention.

FIG. 1 shows a schematic diagram of a milling system using a method of controlling a laser beam preheating temperature of a surface of a workpiece according to the present invention.

As shown, the milling system includes a tool 10 for milling, a workpiece W milled by the tool 10, a laser unit 20 for scanning a laser beam to the workpiece w to preheat the workpiece W, a laser beam controller 30 for controlling a laser beam scanned from the laser unit 20, an infrared ray sensor 40 for measuring a temperature of a heated portion of the workpiece W, and a main control unit 50 for controlling overall operations of the laser beam controller 30, the infrared ray sensor 40, and the like.

The infrared ray sensor 40 is a temperature sensor, and is a device for measuring how much a temperature of the workpiece w is increased by the laser beam scanned by the laser unit 20.

The main control unit 50 is adapted to control an overall operation of the milling system, and includes a computer and the like. Further, data such as a preheating temperature $T_0$, which will be described below, are input to the main control unit 50 to be stored.

In the above-described configuration, the tool 10 processes a workpiece while being rotated, and the workpiece W is moved leftward and rightward. Of course, the workpiece W is not moved leftward and rightward, and the tool 10 may be moved leftward and rightward instead to process the workpiece.

Figure 2:
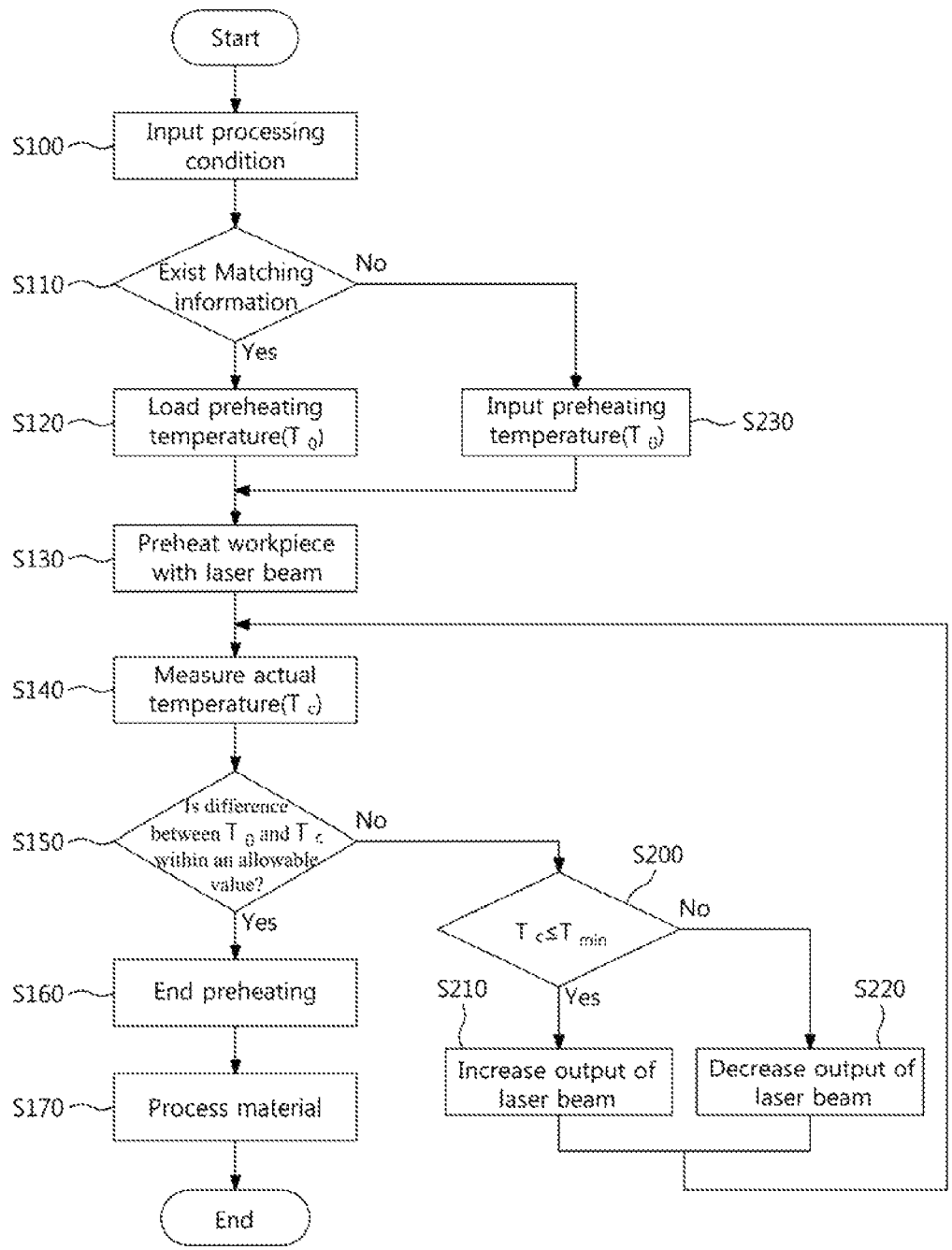
FIG. 2 is a flowchart for explaining an example of the method of controlling a laser beam preheating temperature of a workpiece according to the embodiment of the present invention.

FIG. 2 is a flowchart for explaining an example of the method of controlling a laser beam preheating temperature of a surface of a workpiece according to the embodiment of the present invention.

As shown, the method of controlling a laser beam preheating temperature of a surface of a workpiece according to the present invention includes: a processing condition inputting step S100 of inputting a milling condition; a matching step S110 of determining whether a surface preheating temperature $T_0$ matching with the processing condition input in the processing condition inputting step S100 exists in a preset database DB; a loading step S120 of, when it is determined in the matching step S110 that the matching surface preheating temperature $T_0$ exists, loading the corresponding surface preheating temperature $T_0$; a preheating step S130 of preheating a portion to be processed, by using a laser beam according to the surface preheating temperature $T_0$ loaded in the loading step S120; a measuring step S140 of measuring an actual temperature $T_c$ of the portion preheated in the preheating step S130 with an infrared ray sensor; a comparing step S150 of determining whether the actual temperature $T_c$ measured in the measuring step S140 is similar to the preheating temperature $T_0$ loaded in the loading step S120; an ending step S160 of, when it is determined in the comparing step S150 that the actual temperature $T_c$ is similar to the preheating temperature $T_0$, ending preheating; a lower limit determining step S200 of, when it is determined in the comparing step S150 that the actual temperature $T_c$ is not similar to the preheating temperature $T_0$, determining whether the actual temperature $T_c$ is a lower limit value $T_{min}$ of the preheating temperature $T_0$ or lower; an output increasing step S210 of, when it is determined in the lower limit determining step S200 that the actual temperature $T_c$ is equal to or lower than the lower limit value $T_{min}$ of the preheating temperature $T_0$, increasing an output of the laser beam; and an output decreasing step S220 of, when it is determined in the lower limit determining step S200 that the actual temperature $T_c$ is higher than the lower limit value $T_{min}$ of the preheating temperature $T_0$, decreasing an output of the laser beam.

The processing condition inputting step S100 is a process of inputting a processing condition for milling, and milling conditions such as a cutting speed, a feeding speed, and a cutting depth are input in the step S100. The feeding speed is a speed of the tool 10 or the workpiece W, and the cutting depth is a depth by which the workpiece W is processed by the tool 10.

The matching step S110 is a process of, when the processing conditions are input, determining whether a preheating temperature $T_0$ coinciding with the processing condition is preset.

In detail, the main control unit 50 compares a stored material of the database DB with the processing conditions input in the processing condition inputting step S100, and determines whether a preheating temperature $T_0$ matching with the input cutting speed, feeding speed, and cutting depth for milling exists.

A preheating temperature $T_0$ suitable for various processing conditions is preset and stored in the database DB of the main control unit 50, and the calculation of the preheating temperature $T_0$ will be described in detail below.

In the loading step S120 is a step which is performed when it is determined in the matching step S110 that there exists a preheating temperature $T_0$ matching with a processing condition input to the database DB of the main control unit 50. Thus, in this step, when a preheating temperature $T_0$ matching with the input processing condition exists in the database DB of the main control unit 50, the preheating temperature $T_0$ is withdrawn.

If the preheating temperature $T_0$ is fixed and loaded in the loading step S120, the step proceeds to the preheating step S130.

The preheating step S130 is a process of preheating a portion to be processed, by using a laser beam according to the preheating temperature $T_0$ loaded in the loading step S120. In the process, the laser unit 20 heats an upper surface of the workpiece W under the control of the laser controller 30. Of course, as shown in FIG. 1, the laser beam of the laser unit 20 scans a front portion of the workpiece W processed by the tool 10.

If the workpiece W is preheated, the measuring step S140 is performed next. The measuring step S140 is a step of measuring a temperature of a portion of the workpiece W preheated in the preheating step S130 with the infrared ray sensor 40.

In the measuring step S140, a temperature of the preheated portion measured by the infrared ray sensor 40 is an actual temperature $T_c$, which is transmitted to the main control unit 50.

The measuring step S140 may be continuously performed at the same time when the preheating step S130 is performed, or may be performed if a predetermined time elapses after the preheating step S130 is performed. That is, the performance timing of the measuring step S140 may be set by a user or a designer in advance.

After the actual temperature $T_c$ measured in the measuring step S140 is transferred to the main control unit 50, the comparing step S150 is performed next.

The comparing step S150 is a step of determining whether the actual temperature $T_c$ measured in the measuring step S140 is similar to the preheating temperature $T_0$ loaded in the loading step S120. The similarity of the actual temperature $T_c$ and the preheating temperature $T_0$ is determined by comparing an upper limit value $T_{max}$ and a lower limit value $T_{min}$ which are set in advance.

In detail, the upper limit value $T_{max}$ and the lower limit value $T_{min}$ for the preheating temperature $T_0$, as well as the preheating temperature $T_0$ are set and stored together in the main control unit 50. The upper limit value $T_{max}$ and the lower limit value $T_{min}$ represent a temperature range showing an effect similar to that of the preheating temperature $T_0$, and vary according to a type and a transformation of the workpiece W.

For example, when an optimum preheating temperature $T_0$ of a solid steel of 'A' is 600° C., an upper limit value $T_{max}$ and a lower limit value $T_{min}$ of 'A' should be set to at least a temperature range in which a transformation does not occur, and is set to a temperature range which causes a work performance substantially similar to a case where milling is performed at an optimum preheating temperature $T_0$ of 600° C.

The upper limit value $T_{max}$ and the lower limit value $T_{min}$ are preferably set by an experiment test of the workpiece W, and otherwise, may be set by a rule such as a range within the optimum preheating temperature $T_0 \pm 5\%$, considering an error range and a measurement time interval of the infrared ray sensor 40.

When it is determined in the comparing step S150 that the actual temperature $T_c$ is similar to the preheating temperature $T_0$, the preheating is ended, which corresponds to an ending step S160.

If the ending step S160 is performed, the preheated portion of the workpiece W does not need to be preheated further, and is milled by the tool 10 immediately.

In this way, the milling step performed after the ending step S160 is a processing step S170 of FIG. 2.

Meanwhile, when it is determined in the comparing step S150 that the actual temperature $T_c$ is not similar to the preheating temperature $T_0$, a lower limit determining step S200 of determining whether the actual temperature $T_c$ is equal to or lower than the lower limit value $T_{min}$ of the preheating temperature $T_0$.

When it is determined in the comparing step S150 that the actual temperature $T_c$ is not similar to the preheating temperature $T_0$, the actual temperature $T_c$ is higher than the upper limit value $T_{max}$ of the preheating temperature $T_0$ or equal to or lower than the lower limit value $T_{min}$ of the preheating temperature $T_0$.

Thus, a step of determining whether the actual temperature $T_c$ is equal to or lower than the lower limit value $T_{min}$ of the preheating temperature $T_0$ is exemplified. That is, the comparing step S150 is a process of determining whether the actual temperature $T_c$ is equal to or lower than the lower limit value $T_{min}$ of the preheating temperature $T_0$.

When it is determined in the lower limit determining step S200 that the actual temperature $T_c$ is equal to or lower than the lower limit value $T_{min}$ of the preheating temperature $T_0$, an output increasing step S210 of increasing an output of the laser beam is performed. That is, since the workpiece W is still required to be heated further in this case, an output of the laser beam is increased to strongly preheat the workpiece W.

When it is determined in the lower limit determining step S200 that the actual temperature $T_c$ is higher than the lower limit value $T_{min}$ of the preheating temperature $T_0$, an output decreasing step S220 of decreasing an output of the laser beam is performed. That is, since a temperature of the workpiece W is excessively high in this case, an intensity of the laser beam scanned by the laser unit 20 is reduced or scanning of the laser beam is stopped.

After the output increasing step S210 and the output decreasing step S220, the measuring step S140 is performed again. That is, after the output of the laser beam is increased or decreased, or the scanning of the laser beam is stopped, the temperature of the heated portion of the workpiece W should be measured again so that it is determined whether the preheating of the workpiece W has been properly performed, and thus the step returns to the measuring step S140.

When it is determined in the matching step S110 that a preheating temperature $T_0$ matching with a processing condition input to the database DB of the main control unit 50 does not exist, a direct input step S230 of directly inputting a preheating temperature $T_0$ is performed by a user. That is, a direct input step S230 is performed instead of the loading step S120.

Of course, in addition to the direct input step S230, the work may be stopped or an error message may be output.

Figure 3:
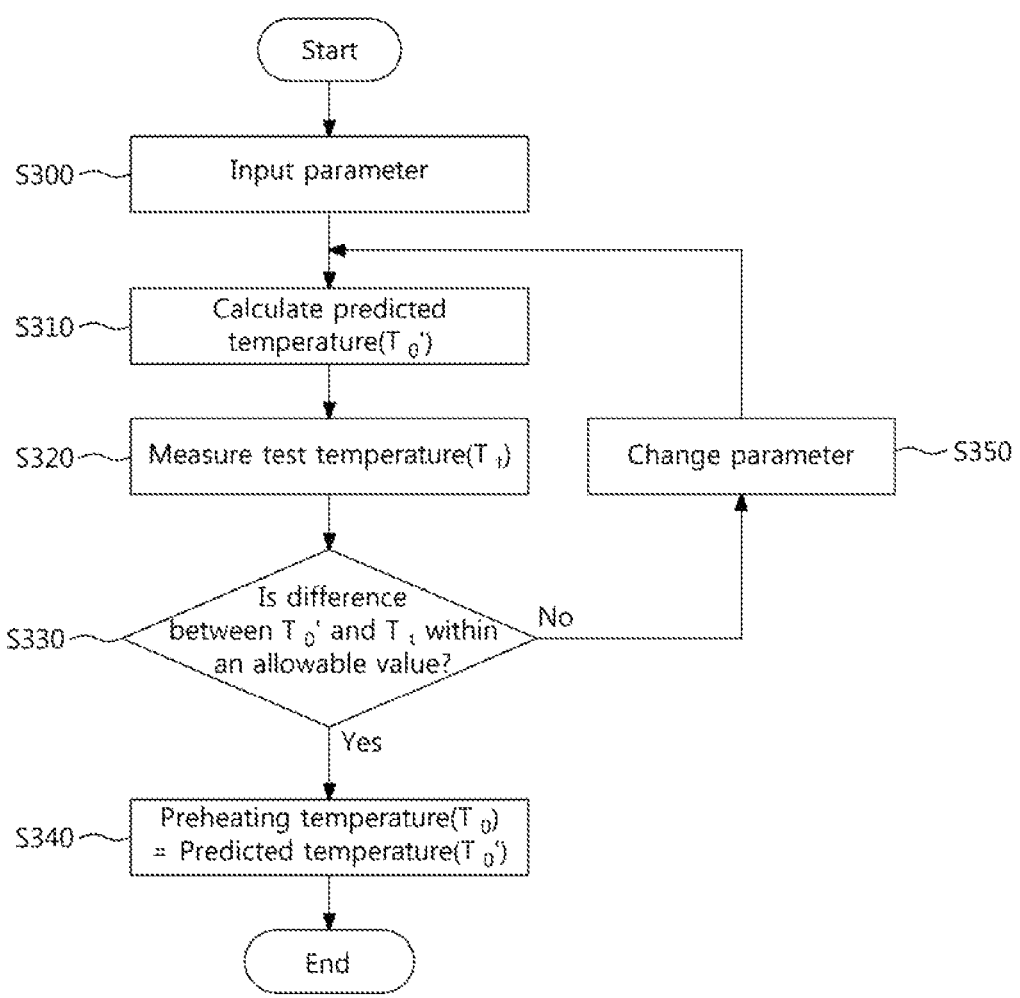
FIG. 3 is a flowchart showing a process of calculating a preheating temperature used in the embodiment of the present invention.

FIG. 3 is a flowchart showing a process of calculating the preheating temperature.

The preheating temperature $T_o$ is preset through a parameter inputting step S300 of inputting a parameter value related to a processing condition, a calculating step S310 of calculating a predicted surface temperature $T_o'$ according to a parameter value input in the parameter inputting step S300, a test temperature measuring step S320 of heating the workpiece with a laser beam and measuring a test temperature $T_t$ of the workpiece, a predicting/determining step S330 of comparing the predicted surface temperature $T_o'$ with the test temperature Tt to determine whether the predicted surface temperature $T_o'$ is similar to the test temperature Tt, and a setting step S340 of, it is determined in the predicting/determining step S330 that a difference between the predicted surface temperature $T_o'$ and the test temperature Tt is within an allowable value, setting the predicted surface temperature $T_o'$ to the preheating temperature $T_o$, and is stored in a database DB of the main control unit 50.

The parameter inputting step S300 is a process of inputting a parameter value related to a processing condition, and the parameter value may be a rotational speed [RPM], a feed rate [mm/min], a depth of cut [mm], or a tool diameter [mm].

The calculating step S310 is a process of calculating a predicted surface temperature $T_o'$ according to a plurality of parameters input in the parameter input step S300.

In the calculating step S310, the predicted surface temperature $T_o'$ is calculated through an experiment by a Box-Behnken method. FIG. 4 shows an example of Box-Behnken Design used in the calculating step S310. The Box-Behnken method is widely used, and thus a more detailed description thereof will be omitted.

When 'AISI 1045 steel' is used as a material of the workpiece W in the Box-Behnken method of the calculating step S310, a predicted surface temperature is deduced by the following equation.

$$T_o' = 861.67 - 5.63S - 15.63F - 78.75D + 1.04S^2 + 3.54F^2 + 22.29D^2 + 3.75S \times F \quad \text{Equation 1}$$

Here, S is a rotational speed [RPM], F is a feed rate [mm/min], and D is a depth of cut [mm].

The test temperature measuring step S320 is a process of measuring a test temperature $T_t$ of the workpiece W after the workpiece W is heated by a laser beam. That is, this step is a process of measuring a temperature of a portion of the workpiece W heated by the laser beam.

The predicting/determining step S330 is a process of comparing the predicted surface temperature $T_o'$ and the test temperature $T_t$ and determining whether the predicted surface temperature $T_o'$ is similar to the test temperature $T_t$. That is, this step is a step of determining whether the test temperature $T_t$ measured in the test temperature measuring step S320 converges to the predicted surface temperature $T_o'$. The similarity of the predicted surface temperature $T_o'$ and the test temperature $T_t$ may be determined according to a reference for determining an effectiveness of general experimental data, and if the test temperature $T_t$ is within ±10% from the predicted surface temperature $T_o'$, it is determined that the test temperature $T_t$ converges to the predicted surface temperature $T_o'$.

The setting step S340 is a process of setting the predicted surface temperature $T_o'$ to the preheating temperature $T_0$ when it is determined in the predicting/determining step S330 that the predicted surface temperature $T_0'$ and the test temperature $T_t$ are within an allowable value. That is, when it is determined that the test temperature $T_t$ is similar to the predicted surface temperature $T_0'$, the predicted surface temperature $T_0'$ deduced through Equation 1 is set and fixed to the preheating temperature $T_0$.

The preheating temperature $T_0$ set in the setting step S340 is stored in the database DB of the main control unit 50.

Meanwhile, when it is determined in the predicting/determining step S330 that the predicted surface temperature $T_o'$ and the test temperature $T_t$ deviate an allowable value, a changing step S350 of changing the parameter values is further performed. That is, when the test temperature $T_t$ does not converge to the predicted surface temperature $T_o'$, the parameter values of a rotational speed [RPM], a feed rate [mm/min], a depth of cut [mm], and a tool diameter [mm] are changed to be applied.

Further, when the parameter values are changed in the changing step S350, the step returns to the calculating step s310 of calculating the predicted surface temperature $T_o'$ again. If the predicted surface temperature $T_o'$ finally becomes similar to the test temperature $T_t$ through repetition of the steps, the predicted surface temperature $T_o'$ is set and fixed to the preheating temperature $T_0$. That is, $T_o$ becomes $T_o'$.

FIG. 5 is a table showing parameter values of a processing condition used in an experiment for verifying a preheating temperature $T_0$ fixed through the above process, and FIG. 6 is a result table of an experiment for verifying a preheating temperature $T_0$ fixed through the above process.

As shown, 6,000 RRM, 200 mm/min, and 0.6 mm are set as intermediate values (0) of a rotational speed [RPM], a feed rate [mm/min], and a depth of cut [mm], respectively, and 3,000 RPM, 150 mm/min, and 0.4 mm are set as lower values (−1) and 9,000 RPM, 300 mm/min, and 0.8 mm are set as higher values (+1).

The verification result is shown in FIG. 6. That is, an error rate of the preheating temperature $T_0$ to the actual temperature $T_c$ is smaller than 0.3, and it can be seen that the predicted surface temperature $T_o'$ calculated through Equation 1 substantially coincides with the actual temperature $T_c$.

Thus, it can be seen that the predicted surface temperature $T_o'$ calculated through Equation 1 is sufficiently effective as the preheating temperature $T_0$.

The scope of the present invention is not limited to the exemplified example, but those skilled in the art can variously modify the embodiment without departing from the scope of the present invention.

What is claimed is:

1. A method of controlling a laser beam preheating temperature of a surface of a workpiece, the method comprising:
   a processing condition inputting step of inputting a milling condition into a main controller;
   a matching step of determining whether a preheating temperature which corresponds to a processing condition input in the processing condition inputting step exists in a preset database of the main controller;
   a loading step of, when it is determined in the matching step that the preheating temperature corresponding to the processing condition exists in the preset database, loading the corresponding preheating temperature into a laser beam controller;

a preheating step of preheating a portion of the workpiece to be processed, by using a laser beam according to the preheating temperature loaded in the loading step;

a measuring step of measuring an actual temperature of the portion preheated in the preheating step with an infrared ray sensor;

a comparing step of determining whether a difference between the actual temperature measured in the measuring step and the preheating temperature loaded in the loading step is within a predetermined allowable value;

an ending step of, when it is determined in the comparing step that the difference is within the predetermined allowable value, ending preheating;

a lower limit determining step of, when it is determined in the comparing step that the difference is not within the predetermined allowable value, determining whether the actual temperature is equal to or lower than a lower limit value of the preheating temperature;

an output increasing step of, when it is determined in the lower limit determining step that the actual temperature is equal to or lower than the lower limit value of the preheating temperature, increasing an output of the laser beam; and an output decreasing step of, when it is determined in the lower limit determining step that the actual temperature is higher than the lower limit value of the preheating temperature, decreasing an output of the laser beam, wherein the measuring step is performed again after the output increasing step and the output decreasing step, wherein the preheating temperature is preset through a parameter inputting step of inputting a parameter value related to a processing condition, a calculating step of calculating a predicted temperature according to a parameter value input in the parameter inputting step, a test temperature measuring step of heating the workpiece with a laser beam and measuring a test temperature of the workpiece, a predicting-determining step of comparing the predicted temperature with the test temperature to determine whether the predicted temperature is similar to the test temperature, and a setting step of, when it is determined in the predicting-determining step that a difference between the predicted temperature and the test temperature is within an allowable value, setting the predicted temperature to the preheating temperature, and is stored in the preset database, wherein a changing step of, when it is determined in the predicting-determining step that a difference between the predicted temperature and the test temperature deviates from an allowable value, changing the parameter value is further performed, and wherein when the parameter value is changed in the changing step, a calculating step of calculating the predicted temperature again is performed based on the changed parameter value.

2. The method as claimed in claim 1, wherein in the calculating step, the predicted temperature is calculated through an experiment using a Box-Behnken method, and is determined by $T_o'=861.67-5.63S-15.63F-78.75D+1.04S^2+3.54F^2+22.29D^2+3.75S \times F$ when the workpiece is a steel, wherein S is a rotational speed, F is a feed rate and D is a depth of cut.

* * * * *